(12) United States Patent
Lu et al.

(10) Patent No.: US 7,851,535 B2
(45) Date of Patent: Dec. 14, 2010

(54) MOLD RELEASE AGENTS EMPLOYING POLYVINYL ALCOHOL

(75) Inventors: Zheng Lu, South Glastonbury, CT (US); Zhixiang Lu, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 293 days.

(21) Appl. No.: 11/828,504

(22) Filed: Jul. 26, 2007

(65) Prior Publication Data

US 2009/0030150 A1 Jan. 29, 2009

(51) Int. Cl.
*C08L 83/06* (2006.01)
*C10M 101/00* (2006.01)

(52) U.S. Cl. .................. 524/430; 524/557; 524/588; 524/847; 524/858; 156/500; 264/402

(58) Field of Classification Search ................ 524/430, 524/557, 588, 847, 858; 156/500; 264/402
See application file for complete search history.

(56) References Cited

U.S. PATENT DOCUMENTS

| 3,872,038 | A | | 3/1975 | Adams et al. | |
|---|---|---|---|---|---|
| 5,219,925 | A | * | 6/1993 | Stephens | 524/860 |
| 5,288,795 | A | | 2/1994 | Fujiki et al. | |
| 5,298,556 | A | | 3/1994 | Stephens | |
| 5,852,107 | A | * | 12/1998 | Gillis et al. | 524/724 |
| 6,342,324 | B1 | * | 1/2002 | Li et al. | 430/67 |

FOREIGN PATENT DOCUMENTS

| JP | 12-191786 A | 7/2000 |
|---|---|---|
| KR | 10-2000-0059814 A | 10/2000 |
| WO | WO 2004/106026 A1 | 12/2004 |

* cited by examiner

*Primary Examiner*—Kelechi C Egwim
(74) *Attorney, Agent, or Firm*—Steven C. Bauman

(57) ABSTRACT

The present invention relates to a composition designed to be a release agent applied to the surface of a molding apparatus and method of using the composition in molding operations. The composition includes a siloxane composition, hydrophilic matting particles, a cross linking agent, a binding agent having hydrophobic and hydrophilic characteristics. The composition may optionally include a carrier. The composition is designed to be applied to the surface of a mold, allowing for repeated use without the need for re-applying the composition between uses.

23 Claims, 3 Drawing Sheets

MOLD RELEASE AGENTS EMPLOYING POLYVINYL ALCOHOL

BACKGROUND OF THE INVENTION

1. Field of the Invention

The present invention relates to a composition designed to be a release agent applied to the surface of a molding apparatus and method of using the composition in molding operations. The composition includes a siloxane composition, a cross linking agent, hydrophilic matting particles and a binding agent having hydrophobic and hydrophilic characteristics. The composition is designed to be applied to the surface of a mold, allowing for repeated use without the need for re-applying the composition between uses.

2. Brief Description of Related Technology

Molding processes used to produce molded articles from elastomeric compositions generally use mold release compositions to facilitate removal of formed parts from the mold and to maintain surface quality of the part. Mold release compositions should perform their function without interfering with the formation of the part or the subsequent properties desired from the molded article. Many conventional mold release compositions no longer perform effectively after a single use and therefore require re-application of the release composition for each set of parts. This interrupts the continuity of the molding process, requiring down-time and running the mold without resin to cure the mold release composition.

Mold release compositions are applied to the surface of the molds used to produce elastomeric articles, but commercially available mold release compositions have been shown to perform poorly after a single cycle of use and have been known to leave release composition residue on the surface of the molded part. The transfer of the mold releasing agent to the molded article causes poor finishing such as stickiness of the molded article. Due to this transfer, molded articles are generally required to be cleaned after formation, adding to the time required to complete the article and reducing efficiency.

Moreover, certain articles require different surface finishes. For example, some products require a high glossy, smooth finish. Others, such as automotive parts including dashboards, require a low gloss, matte finish. Providing effective release compositions which form a matte finish has proven especially difficult. Generally, low degree matte finish is currently achieved using sacrificial release agents, which cannot be repeatedly used without reapplication, and further results in release agent transfers.

Thus, a need currently exists for a release agent which allows the formation of an article with a low gloss, matte finish, which has enhanced durability, high cycle capability, and which allows repeated use without re-application of the release agent after each use.

SUMMARY OF THE INVENTION

In one aspect of the invention, there is provided a mold release composition, which includes a siloxane composition, a cross linking agent, hydrophilic matting particles, and a binding agent which has hydrophobic and hydrophilic characteristics. Desirably, the binding agent is polyvinyl alcohol.

In another aspect of the invention, there is provided a method of forming molded elastomeric articles, the method including the steps of providing a composition, where the composition includes a siloxane composition, a cross linking agent, hydrophilic matting particles, and a binding agent which has hydrophobic and hydrophilic characteristics, applying the composition to the surface of a mold in a molding apparatus, forming the elastomeric article in the molding apparatus, and releasing the molded elastomeric article from the molding apparatus.

In another aspect of the invention, there is provided a mold for producing elastomeric articles including a mold surface and a mold release composition adhered to the surface of the mold, where the composition includes a siloxane composition, a cross linking agent, hydrophilic matting particles, and a binding agent having hydrophobic and hydrophilic characteristics.

DETAILED DESCRIPTION OF THE INVENTION

Figure 1:
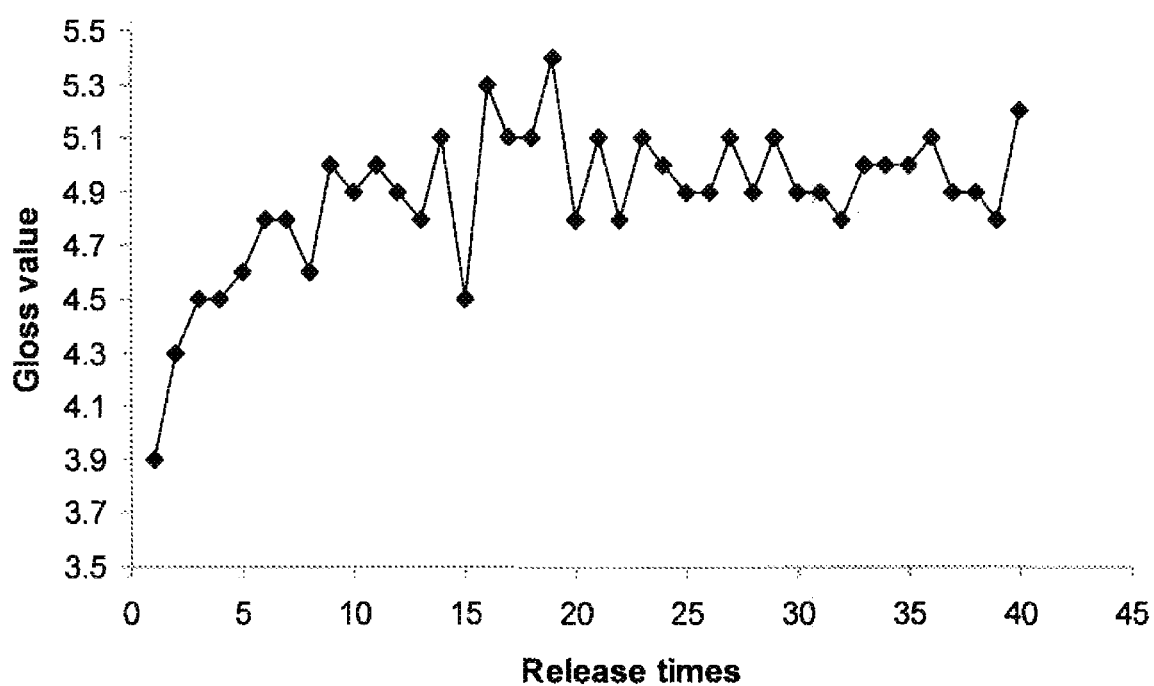
FIGS. 1-3 are xy plots of release times versus gloss values

The present invention is directed to a mold release composition, which provides molded articles having a low gloss, matte finish. The molding apparatus may be any type of apparatus, including compression, injection and open molding devices. The mold release composition may be applied to the surface of the mold in the molding apparatus, and provides a suitable release of the formed article once molding is complete. The mold release composition provides a low gloss, matte finish to the article over an acceptable mold cycle, without substantial surface defects or imperfections. Additionally, the mold release composition exhibits enhanced adhesion properties to the mold surface, which provides durability of the release coating.

In traditional injection molding systems, elastomeric material is injected into the apparatus, which then forms the molded article. The surface of the mold in the apparatus is optionally coated with a release agent, which provides an effective release of the article after formation. In addition to the release properties of the composition, the composition as described herein is designed to form the desired matte finish on the surface of the molded article.

The "gloss value" of a molded article is defined as the ratio of the light reflected off the surface of the article to the incident light. Theoretically, the range of the gloss scale for non-metal articles is from 0 to 100, with 100 being the most glossy surface and 0 being the least glossy surface. The gloss value can be measured by using a traditional reflection or gloss meter, with the reflection angle being either 20°, 45°, 60°, or 85°. A "low gloss, matte finish" is defined herein as a surface of a molded article which has a low gloss value, desirably less than about 5.0, and more desirably within a range of about 0.1 to about 1.0 measured with a 60° gloss meter. Elastomeric articles prepared using the composition described herein will more desirably have a gloss value of less than about 1.0. More desirably, a low gloss, matte finish has a value of about 0.4 to about 0.6.

The mold release composition is applied to the surface of the mold in the molding apparatus, and is cured so that it is effectively adhered to the surface of the mold. The elastomeric material to be molded is introduced into the mold after application of the mold release composition, and the molded article is formed. After formation, the molded article is released from the mold. After release, the gloss value measurement of the article may be taken.

As mentioned above, the mold release composition includes a siloxane composition, a cross linking agent, hydrophilic matting particles, a binding agent which has hydrophobic and hydrophilic characteristics, and a carrier.

The siloxane composition included in the mold release composition is generally a hydrophobic composition. The hydrophobic composition provides both a curable matrix for adherence of the composition to the mold, as well as an effective release of the molded article. The siloxane desirably has the formula I:

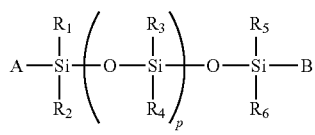

where $R^1$, $R^2$, $R^3$, $R^4$, $R^5$ and $R^6$ may be the same or different and may be $C_{1-6}$alky; A and B may be the same or different and may be $C_{1-6}$ alkyl, $C_{2-6}$ allyl, $C_{1-4}$ alkoxy, silanol, carbinol, carboxy, acryloxy, acetoxy, halo, acryloxypropyl, aminopropyl or amino, and p is from 1 to about 100,000.

Generally, p is a number greater than one. Most desirably, p is from 500 to 1000. Desirably, A and B are silanol groups.

Preferred hydrophobic siloxane compositions include silicones, polydimethylsiloxane (PDMS), hydroxyl-terminated polydimethylsiloxane, and silanol terminated polydimethylsiloxane. The siloxane composition may optionally be water-based.

While the hydrophobic siloxane composition provides a suitable releasing surface, to form an article with a low gloss, matte surface, the mold release composition should be sufficiently rough to the touch. The such way to create the desired rough surface is to incorporate matting particles on the surface of the mold. By incorporating particles in the mold release composition, the rough article surface can be formed. Any type of matting particles may be used, including silica oxides or other metal oxides such as aluminum oxide and titanium oxide with desired particle sizes, or other common reagents known as matting agents. Desirably, the particles are inorganic oxide particles. Incorporation of the particles in the composition will allow the coated mold surface to be rough and bumpy, thus creating a rough molded article surface. The matting particles used in the present invention are hydrophilic in nature. Desirably, the hydrophilic matting particles will have a particle size of about 20 nm to about 10 µm.

Given the hydrophobic nature of the siloxane composition and the hydrophilic nature of the matting particles, the composition may also include a "binding agent" to maintain the composition. As defined herein, a "binding agent" is a material suitable to hold or bind the siloxane composition and the hydrophilic matting particles together to form a durable release coating. Desirably, the binding agent has both hydrophilic and hydrophobic characteristics. One such binding agent is polyvinyl alcohol (PVA), which is hydrophilic, but can also be adsorbed on hydrophobic surfaces due to hydrophobic interaction. Thus, PVA has the ability to interact with both the siloxane composition and the hydrophilic matting particles, holding them together, and reducing or preventing the loss of the hydrophilic matting particles from the composition.

Any PVA may be used in the compositions described herein. Desirably, the PVA is partially hydrolyzed. The hydrolysis ratio of the PVA can be adjusted to change its adhesion to the hydrophobic or the hydrophilic components in the composition. A higher hydrolysis ratio generally will provide a weaker adhesion to the hydrophobic composition (i.e., the siloxane composition). Lower hydrolysis ratio generally provides a stronger adhesion to the hydrophobic composition, thus giving more stabilized matting particles. Desirably, the PVA has a relatively low hydrolysis ratio. However, PVA having a hydrolysis ratio ranging from about 60% to about 99% works functionally well in compositions described herein.

In addition, the molecular weight of the PVA may affect the adhesion of the composition to the mold surface, as well as the binding to both the siloxane composition and the hydrophilic matting particles. As the mold release composition is more strongly adhered to the surface of the mold, the less of the mold release composition will be removed from the surface after each molded article is created. The mold release composition should have strong adhesion to the surface of the mold, thus allowing multiple molded articles to be formed without the need to re-apply the mold release composition between each formation of the article. The mold release composition will desirably release at least two molded articles without the need for repeating the application of the mold release agent to the mold. Although PVA with higher molecular weight provides stronger binding, it is preferred to avoid extremely high molecular weight PVA. When the molecular weight of the PVA becomes too high, the composition becomes quite viscous, which can make application to the surface of the mold more difficult. The preferred PVA has a molecular weight of about 8,000 to about 100,000.

Although the separate components described above may be added without other materials, it may optionally be desired to include a carrier. When included, the carrier should be present in the range of about 70% to about 98% by weight, and should desirably be water. The mold release composition may optionally include other additives such as cross linking agents, surfactants, or other solvents.

The cross linking agent should be present in an amount of about 0.1% to about 10% by weight. Among useful cross linking agents are those which correspond to the formula II:

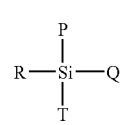

where R is H, $C_{1-3}$ alkyl or $C_{2-6}$ alkyl; P, Q and T may be the same or different, and may be H, alkoxy, acetoxy or halo. One particularly useful cross linking agent is methyltriethoxysilane.

The mold release compositions may further include other additives to alter or enhance the overall properties of the composition. For example, a perfluoro compound such as a particulate perfluoro compound may be suspended in the composition to further reduce the surface energy of the release film and import higher release performance. Particulate polytetrafluoroethylene is an example of such an additive and is desirably used in amounts of less than about 1.0% by weight of the total composition. Another optional additive is a condensation catalyst to accelerate the curing of the release film on the mold surface, especially when the mold is conditioned at lower temperatures such as below 150° F. Yet another optional additive is a biocide. The auction of a biocide is to preserve the release agent from degradation due to bacteria and other biological beings.

The relative ratios of the hydrophobic composition, hydrophilic matting particles and the binding agent in the mold release composition may affect the releasability and/or the surface properties of the molded article. For example, a high hydrophobic composition ratio, as compared to the other components, provides an easier release from the molding apparatus, but results in a very smooth, high gloss surface of the molded article. In contrast, having a high hydrophilic matting particles ratio, as compared to the other components, will provide a rough, low gloss surface of the molded agent, but provides a more difficult release from the molding apparatus. Containing too high an amount of binding agent, as compared to the other components, may result in the composition being quite sticky, and thus may become difficult to apply to the surface of the mold.

Desirably, therefore, the composition includes about 0.1% to about 5.0% by weight of hydrophobic composition, about 10.0% to about 10.0% by weight of hydrophilic matting particles, and about 0.1% to about 10.0% by weight of binding agent. The proper combination of these components provides a mold release composition that adheres effectively to the surface of the mold, while also forming a low gloss, matte finish of the molded article surface.

The present invention also is directed at methods of preparing mold release compositions. In accordance therewith, the mold release composition may be prepared by providing the above components and mixing them together at room temperature. Additionally, a solvent may be included, such as water, in the mixture. Other additives or surfactants may optionally be included in the composition during mixing.

The present invention further includes a method of preparing elastomeric articles using the compositions described herein. In one embodiment, a mold release composition is provided. The composition includes a siloxane composition, a cross linking agent, hydrophilic matting particles, a binding agent having both hydrophobic and hydrophilic characteristics, and a carrier as described above. The mold release composition may then be applied to the surface of a mold in a molding apparatus. The molding apparatus may be any desired molding apparatus, including compression and injection molding apparatus.

The mold release composition may be applied to the surface of the mold by any means desired, including spreading, painting, dipping, pouring, spraying, or the like. Desirably, the mold release composition is sprayed onto the surface of the mold and allowed to form a release film. The composition is cured at a high temperature, most desirably at or above 180° F.

Optionally, a second mold release agent may be applied to the surface of the mold, after the application of the mold release composition set forth above. Addition of a second mold release agent may provide a lower surface tension release coating for an even easier and quicker release of the molded article from the mold surface.

Optionally, a mold sealer may be applied to the surface of the mold. The mold sealer may be applied before application of the mold release composition. The mold sealer contains chemicals, such as methyltriethoxysilane, which allow the release agent to chemically bind onto the mold surface to form a durable coating.

Once the mold release composition has been applied to the surface of the mold and cured, the elastomeric material may then be introduced into the mold. The elastomeric material may be any material from which the user decides to make a molded article. Suitable elastomeric materials include urethanes, such as thermoplastic urethane (TPU), and rubbers, such as those used in making shoe soles. Once introduced into the mold, the elastomeric material may be molded into the desired article. Once the elastomeric material has been molded to completion, the elastomeric article may be released from the molding apparatus.

By incorporating the mold release composition on the mold surface as described above, the elastomeric article can be removed from the molding apparatus with minimal difficulty. Further, incorporation of the mold release composition as described herein may provide an article having a low gloss, matte finish. Elastomeric TPU articles prepared by this method have a low gloss surface, preferably having a low gloss value of less than about 1.0, and most desirably having a gloss value of about 0.4 to about 0.6.

Furthermore, the incorporation of the mold release composition as described herein allows the formation and release of multiple elastomeric articles, while reducing or avoiding the need to re-apply or touch up the mold release composition onto the mold surface. The mold release composition is substantially stable on the mold surface, and will not require re-application after each formation of a molded article. The mold release composition described herein allows at least two elastomeric articles to be molded and released before the mold release composition must be re-applied to the surface of the mold. In some embodiments, at least 15 releases can be obtained without re-applying the composition to the surface, and more desirably about 40 releases can be obtained without re-applying the composition to the surface.

In addition, the mold release composition provides for stable binding between the hydrophobic composition and the hydrophilic matting particles, allowing multiple releases of the formed elastomeric article, without experiencing loss of the hydrophilic matting particles from the coated mold surface. The mold release composition described herein allows at least two elastomeric articles to be molded and released without substantial transfer or loss of the hydrophilic matting particles from the coated mold surface. Desirably, at least 15 releases can be obtained without substantial transfer or loss of hydrophilic matting particles from the coated mold surface, and more desirably about 40 releases can be obtained without substantial transfer or loss of hydrophilic matting particles from the coated mold surface.

The features and advantages of the present invention are more fully shown by the following examples which are provided for purposes of illustration, and are not to be construed as limiting the invention in any way.

EXAMPLES

Example 1

A mold release composition used to prepare molded articles having a low gloss, matte finish was prepared. Table 1.1 sets forth the amounts of the components that were used in preparing the mold release composition. A second release coating and mold sealer were additionally prepared. Tables 1.2 and 1.3 set forth the compositions of the mold sealer and the optional second release agent. For the continence of practical use, the same formulation in this example for both the mold sealer and optional second release coating were used.

TABLE 1.1

Composition of mold release composition

| Component | % wt |
|---|---|
| Methyltriethoxysilane | 0.2~5.0 |
| Hydroxyl-terminated PDMS | 0.1-5.0 |
| Hydrophilic silica particles | 1.0~10.0 |
| PVA (hydrolysis ratio ~60.0%-99.0%) | 0.1~10.0 |
| Surfactants (HLB 5~30) | 0.1~1.0 |
| Water | 70.0~98.0 |

TABLE 1.2

Composition of mold sealer

| Component | % wt |
|---|---|
| Methyltriethoxysilane | 0.1~9.0 |
| Hydroxyl-terminated PDMS | 0.1~8.0 |
| Surfactants (HLB 5~30) | 0.1~1.0 |
| Water | 80.0~98.0 |

TABLE 1.3

Composition of second release coating

| Component | % wt |
|---|---|
| Methyltriethoxysilane | 0.1~9.0 |
| Hydroxyl-terminated PDMS | 0.1~8.0 |
| Surfactants (HLB 5~30) | 0.1~1.0 |
| Water | 80.0~98.0 |

A molding apparatus was provided, specifically a high-gloss Q-steel panel. Without any application of the mold release composition, the mold surface was smooth with a higher gloss value, generally greater than about 95.0. The mold sealer was applied to the surface of the mold. Silica particles and PVA were mixed well with methyltriethoxysilane and hydroxyl-terminated PDMS in the presence of the surfactants into an oil-in-water emulsion. The resulting composition was then sprayed to a sealer coated smooth mold surface. A second release coating was then spray applied on the mold release composition. The entire coating was cured for 30 minutes at 180° F., at which time the composition was crystallized on the mold surface.

Figure 2:
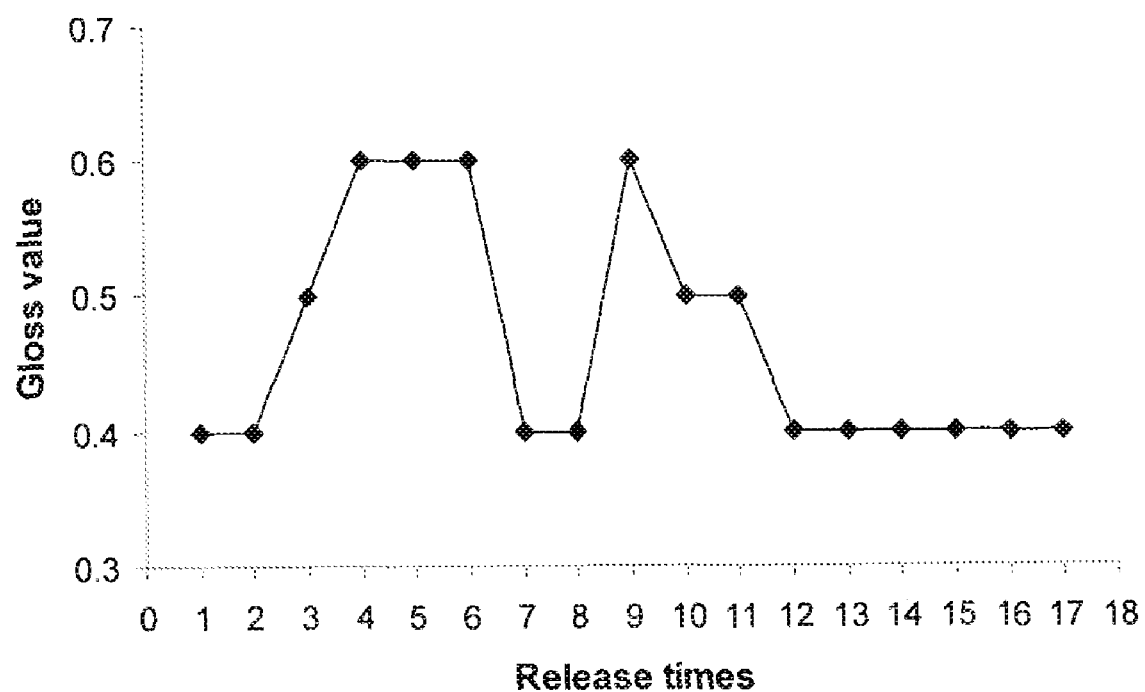

Water-borne TPU was then sprayed on the preheated, coated surface (180° F., and was cured in 8 minutes. The molded article was then released. The feature of the matting effects of the release coating was reflected onto the released TPU surface. More than 40 releases were obtained before any touch-up of the mold release composition was performed, and the gloss value of the released TPU parts was observed to be between 4.0 and 6.0 as shown in FIG. 1. No touch-up of the matting agent was needed. When a mold having a rough mold surface was used, more than 15 easy releases were obtained, and the gloss value of the released TPU was reduced further, ranging from 0.4 to 0.6, as shown in FIG. 2. In contrast, traditional semi-permanent release agents give a matte value of higher than 2.0 on released TPU parts from the same rough mold surface.

Example 2

This example describes another mold release composition prepared in accordance with the present invention. Table 2.1 indicates the weight percentage of each of the following components in the mold release composition: methyltriethoxysilane, hydroxyl-terminated polydimethylsiloxane (PDMS), hydrophilic silica particles, PVA, surfactants, and a carrier (water). The ratio of the hydrophilic silica particles to the other components is lower than the composition set forth in Table 1.1, while the compositions of the mold sealer and release coating are the same as those shown in Tables 1.2 and 1.3 in Example 1.

Figure 3:
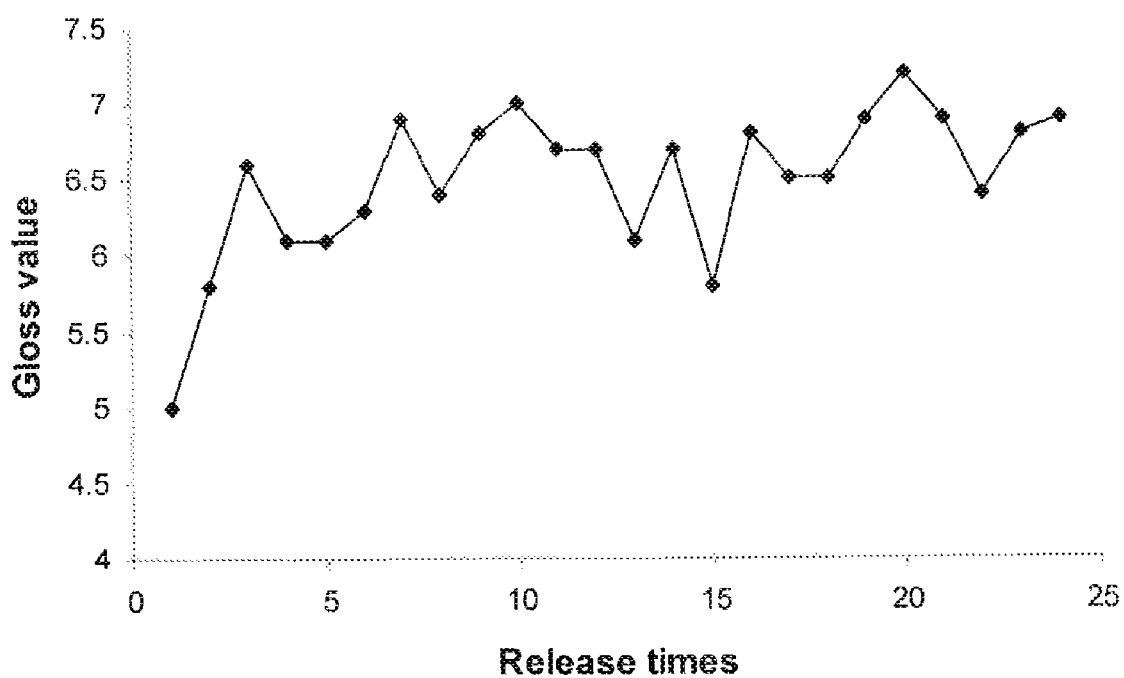

The methods used to mix the components are the same as in Example 1. The high-gloss Q-steel panel was treated with the mold sealer, the mold release composition and the release coating, as described in Example 1. Water-borne TPU was sprayed on the preheated, coated surface (180° F.). More than 20 releases were obtained before any touch-up of the mold release composition was applied. The gloss value of the released TPU parts was observed to be to about 5.0~7.5 as shown in FIG. 3. No touch-up of the matting agent was needed. When a mold with a rough surface was used, the gloss value of the released TPU was reduced, giving a result similar to that shown in FIG. 2.

TABLE 2.1

Composition of mold release composition

| Component | % wt |
|---|---|
| Methyltrimethoxysilane | 0.2~5.0 |
| Hydroxy-terminated PDMS | 0.1~5.0 |
| Hydrophilic silica particles | 1.0~10.0 |
| PVA (hydrolysis ratio ~60.0-99.0%) | 0.1~9.0 |
| Surfactants (HLB 5~30) | 0.1~1.0 |
| Water | 70.0~98.0 |

What is claimed is:

1. A mold release composition prepared from a mixture comprising:
   a. a siloxane composition;
   b. a cross linking agent;
   c. a hydrophilic matting particles; and
   d. a binding agent having hydrophobic and hydrophilic characteristics.

2. The mold release composition of claim 1, wherein said binding agent comprises a partially hydrolyzed polyvinyl alcohol.

3. The mold release composition of claim 2, wherein said polyvinyl alcohol is about 60% to about 99% hydrolyzed.

4. The mold release composition of claim 1, wherein said binding agent has a molecular weight of from about 8,000 to about 100,000.

5. The mold release composition of claim 1, wherein said mold release composition comprises about 0.1% to about 10.0% by weight binding agent.

6. The mold release composition of claim 1, wherein said siloxane composition is of the formula:

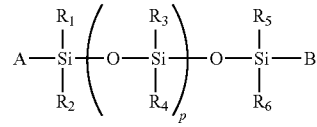

wherein $R^1$, $R^2$, $R^3$, $R^4$, $R^5$ and $R^6$ are independently selected from a $C_{1-6}$ alkyl; A and B are independently selected from the group consisting of $C_{1-6}$ alkyl, $C_{2-6}$ allyl, $C_{1-4}$ alkoxy, silanol, carbinol, carboxy, acryloxy, acetoxy, halo, acryloxypropyl, aminopropyl and amino; and p is a number from about 500 to about 1,000.

7. The mold release composition of claim 1, wherein said siloxane composition comprises silanol terminated polydimethylsiloxane.

8. The mold release composition of claim 1, wherein said mold release composition comprises about 0.1% to about 5.0% by weight siloxane composition.

9. The mold release composition of claim 1, wherein said hydrophilic matting particles are selected from the group consisting of silica and metal oxides.

10. The mold release composition of claim 1, wherein said hydrophilic matting particles have an average particle size of from about 20 nm to about 10 μm.

11. The mold release composition of claim 1, wherein said mold release composition comprises about 1.0% to about 10.0% by weight hydrophilic matting particles.

12. The mold release composition of claim 1, wherein said mold release composition comprises about 0.1% to about 5.0% by weight siloxane composition;
   about 1.0% to about 10.0% by weight matting particles; and about 0.1% to about 10.0% by weight binding agent.

13. The composition of claim 1, wherein said composition is capable of providing a mold release coating useful in providing an article having a gloss value of less than about 1.0 as determined by a gloss meter.

14. The composition of claim 1, further comprising a carrier.

15. The composition of claim 14, wherein said carrier comprises water.

16. A method of releasing an elastomeric article from a molding apparatus, comprising the steps of:
   providing the mold release composition of claim 1;
   applying said mold release composition to the surface of a mold in a molding apparatus;
   heating the mold surface to cure the mold release composition;
   forming an elastomeric article in said molding apparatus; and
   releasing the elastomeric article from said molding apparatus.

17. The method of claim 16, wherein said released elastomeric article has a low gloss finish.

18. The method of claim 16, wherein said released elastomeric article has a matte finish.

19. The method of claim 16, wherein said released elastomeric article has a low gloss value that is lower than about 1.0 as determined by a 60° gloss meter.

20. The method of claim 16, wherein said released elastomeric article has a low gloss value that is from about 0.4 to about 0.6 as determined by a 60° gloss meter.

21. The method of claim 16, wherein said step of releasing the elastomeric article from the mold in the molding apparatus can be repeated at least two times without repeating said step of applying said mold release agent to a mold in a molding apparatus.

22. The method of claim 16, wherein multiple cycles of steps of forming an elastomeric article in said molding apparatus and releasing the elastomeric article from said molding apparatus are performed without substantial loss of low gloss value.

23. A mold for producing elastomeric articles comprising:
   a mold surface; and
   a cured reaction products of the mold release composition of claim 1 adhered to said surface.

* * * * *